United States Patent [19]

Hodgson et al.

[11] 4,017,275

[45] Apr. 12, 1977

[54] CENTRIFUGAL SEPARATOR

[75] Inventors: Robert A. Hodgson; Charles K. Gravis, both of Tulsa, Okla.

[73] Assignee: Maloney-Crawford Tank Corporation, Tulsa, Okla.

[22] Filed: Mar. 8, 1973

[21] Appl. No.: 339,311

[52] U.S. Cl. .................................. 55/1; 55/177; 55/309; 55/339; 55/440; 55/456; 55/459 C
[51] Int. Cl.² ................................... B01D 45/12
[58] Field of Search ............. 55/177, 1, 337, 456, 55/459 C, 309, 339, 440

[56] References Cited

UNITED STATES PATENTS

| | | | |
|---|---|---|---|
| 2,659,488 | 11/1953 | Williams | 55/177 |
| 2,681,150 | 6/1954 | Reid | 55/174 |
| 3,386,230 | 6/1968 | Riesberg et al. | 55/337 |
| 3,481,118 | 12/1969 | Willis et al. | 55/338 |
| 3,499,270 | 3/1970 | Paugh | 55/459 |

*Primary Examiner*—Bernard Nozick
*Attorney, Agent, or Firm*—Head, Johnson & Chafin

[57] ABSTRACT

An improved type of centrifugal separator for separating liquids such as oil and/or water from a mixture of gas and liquid. It consists of an upright cylindrical shell divided by transverse dividers into three chambers. The mixture of gas and liquid is introduced through a tangential diverter into the lower chamber to produce a high velocity vortex of gas and liquid. A central axial vortex tube penetrates and is sealed through both transverse dividers. This vortex tube is comprised of two spaced longitudinally aligned portions which define a gap between them. The gap is positioned inside the central chamber. The upper end of the vortex tube extends into the top chamber and is sealed into a first mist extractor. The lower end of the vortex tube extends into the lower chamber.

Due to the vortex action the liquid is thrown outwardly against the inner wall of the shell, the gas forming a high velocity vortex column along the central axis of the shell. This gas column moves upwardly through the central axial vortex tube. Entrained liquid is thrown outwardly against the wall of the tube by centrifugal action and is drawn into the central chamber through the gap between the two sections of the vortex tube. The gas continues to move upwardly into the first mist extractor. Here it is passed through a tortuous passage between elongated vertical obstacles such that the liquid is scrubbed out against these surfaces. The gas then passes through a second mist extractor, and essentially liquid free gas passes out an opening in the top of the shell.

11 Claims, 5 Drawing Figures

U.S. Patent      April 12, 1977      4,017,275
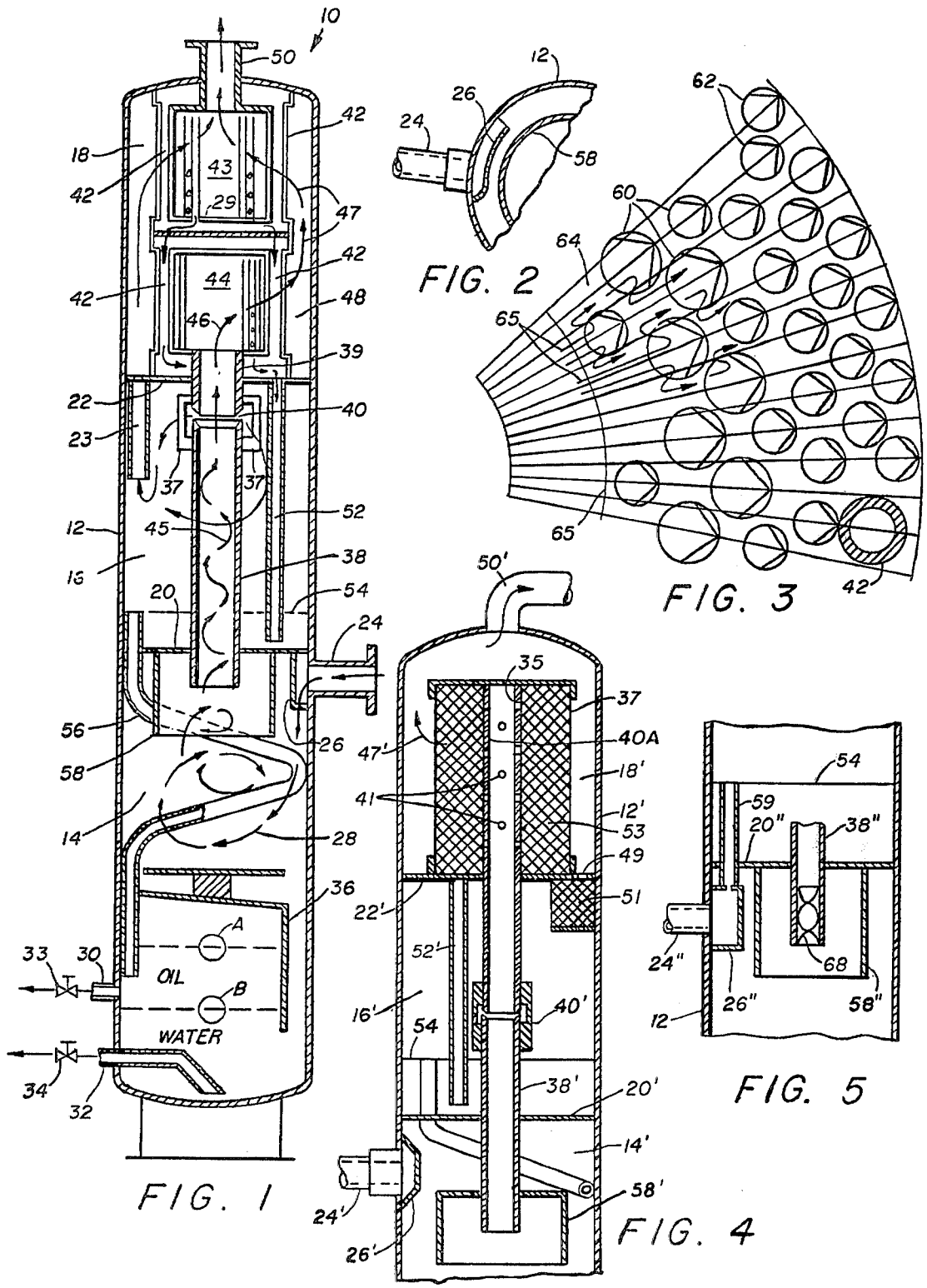

CENTRIFUGAL SEPARATOR

BACKGROUND OF THE INVENTION

This invention relates to the separation of liquid entrained in a gas by centrifugal action. More particularly, it is concerned with the separation of oil and water from natural gas.

In the prior art there are a number of designs described in which a cylindrical chamber with two sections, a lower conical shaped section and an upper section are provided. The gas and liquid mixture is injected tangentially into the lower section so as to provide a helically revolving mixture of gas and liquid. A central axial tube is provided for the gas to move upwardly towards an exit pipe while the liquid moves downwardly against the inner surface of the chamber and is withdrawn at the bottom of the lower section.

The prior art devices are limited in their ability to handle large quantities of liquid. The present design is capable of handling large volumes of liquid.

SUMMARY OF THE INVENTION

It is a primary object of this invention to provide a self-contained apparatus in which a mixture of gas with entrained oil can be introduced under pressure, and from which the liquid can be drained off at the bottom and essentially liquid-free gas withdrawn from the top.

This and other objects are realized and the limitations of the prior art are overcome in this invention by using a vertically oriented cylindrical shell which is divided into three chambers by two spaced transverse dividers. The gas and liquid mixture is introduced into the lower chamber through an opening near the lower transverse divider, and the mixture is given a high velocity tangential motion. In this rotating vortex, most of the liquid is thrown outwardly by centrifugal action and attaches itself to the inner surface of the outer wall and, moving downwardly, collects in the bottom of the lower chamber. A central axial vortex tube is sealed through the two transverse dividers and the rotating stream of gas and entrained liquid moves upwardly through the central axial vortex tube into the top chamber. This tube is divided and a narrow gap is provided between the two parts of the tube so that as the gas moves upwardly, the liquid thrown out against the walls along with a small amount of gas is drawn through the gap into the second chamber while the remaining gas continues to move upwardly into the top chamber.

The top end of the axial tube is sealed into a first mist extractor. This is a cylindrical system through which the gas must pass, in a general radial direction. In moving through the mist extractor, the gas passes through a tortuous path, and is diverted by numerous obstacles. In rubbing against these surfaces the liquid droplets are caught and attached to the obstacles, the surfaces of which are wetted and the film of liquid then permits the detached liquid droplets to coalesce on the walls and move downwardly to the bottom of the mist extractor. Means are provided to carry the liquid down into the second or central chamber, and from there into the lower chamber where the collected liquid is removed. The relatively dry gas from first mist extractor is comingled with gas drawn through vortex tube gap, then withdrawn through a second mist extractor and then through an opening in the top of the shell.

BRIEF DESCRIPTION OF THE DRAWINGS

These and other objects of this invention and a better understanding of the principles and details of the invention wil be evident from the following description, taken in conjunction with the appended drawings, in which:

FIG. 1 represents in vertical cross section one embodiment of this invention

FIG. 2 indicates a detail of the lower part of the apparatus by means of which the entering gas and liquid mixture is given a tangential motion FIG. 3 indicates a detail of a part of the mist extractor FIG. 4 is a vertical cross section of another embodiment of the invention including a second type of mist extractor FIG. 5 illustrates a further improvement including a twisted vane system inside the axial tube to provide greater spinning motion of the gas.

DESCRIPTION OF THE PREFERRED EMBODIMENT

Referring now to the drawings and in particular to FIG. 1, there is shown, indicated generally by the numeral 10, one embodiment of this invention. It includes a vertically oriented cylindrical shell 12 which is divided into three compartments or chambers, a lower chamber 14 separated from a central chamber 16 by a transverse divider 20, and a top chamber 18 separated from the central chamber 16 by a second transverse divider 22. The gas and entrained oil mixture is introduced through a pipe 24 in the upper part of the lower section 14. As shown in FIG. 2, which describes a detail of this portion of the apparatus in a horizontal plane, the entering gas through pipe 24 is carried in a tangential direction by a deflector means 26. The area of the deflector is less than the area of the pipe 24 so that the entering mixture is given a high velocity rotary motion inside the lower chamber. This is indicated generally by the circulating arrows 28 in FIG. 1.

Under this circular helical motion the centrifugal action throws the heavier droplets of liquid outwardly where they are collected against the inner wall of the shell 12. The liquid that collects on the walls and eventually falls downwardly along the walls into the bottom portion of the shell 12 is drained off by means of pipes 30 and/or 32 and valves 33 and 34 actuated by liquid level controls A, B, or other means well known in the art. The entering gas and oil mixture is under pressure so that there is an increase in velocity of the mixture as it flows into the chamber, thus permitting the high velocity helical motion.

An axial pipe or vortex tube 38 penetrates and is sealed through the first and second transverse dividers 20 and 22. This tube 38 is cut at a point inside the center section 16 and the two parts are longitudinally aligned and spaced by supports in such a way as to maintain a small gap 40 between the two ends of the pipe. The support means is provided with drain holes the area of which is greater than the area of gap 40. An alternate support means consists of U-shaped bars spaced around the pipe. The spaces between the bars 37 allow liquid passage to chamber 16. The gas moving upwardly under pressure of the input, and rapidly rotating in accordance with arrows 45, throw additional liquid outwardly against the inner wall of the tube 38 where it can either slide downward into the bottom section, or if it is carried upwardly by the gas, it will pass outwardly through the gap 40 into the central section 16.

This section is under slightly lower pressure than tube 38 but higher in pressure than chamber 18 at the top of the separator, due to the bypass pipe 23 connecting chamber 16 with chamber 18 allowing a small amount of gas to bypass pipe 39 and bottom mist extractor 44 and maintaining chamber 16 at a lower pressure due to the pressure drop across the bottom of mist extractor 44.

An alternate source of lower pressure to allow chamber 16 to operate at lower pressure is shown in FIG. 5 where pipe 59 is connected to the reduced area of the tangential diverter 26'', where due to the higher fluid velocity the pressure is lower. This serves the purpose of also allowing any moisture in this bypass gas to be absorbed into the inlet system.

The upwardly moving gas in accordance with arrow 46 continues up the vortex tube 39 and passes through a pair of mist extractors 43 and 44. The lower mist extractor 44 is one in which the gas moves radially outwardly into the space of chamber 18. In this space the bypass gas from gap 40, passing upward through pipe 23 comingles with gas from pipe 39 which passes through the extractor 44 and both together enter the second mist extractor moving radially inwardly, and then to the outlet pipe 50.

The mist extractors 43 and 44 are chambers which are comprised of parallel circular plates, a portion of which is illustrated in FIG. 3. These plates are supported in a parallel coaxial position. Over an annular space on the plates holes are drilled. There are inserted into these holes and welded to the plates a plurality of rods or vertical members of various cross sections. These rods can be angles, strips or cylinders as desired. They are arranged in patterns so that the gas in moving radially outwardly or inwardly must reverse a tortuous path and have close and intimate contact with the walls of these obstacles.

In FIG. 3 the position of the vertical members is shown for a radially outward moving fluid as indicated by the arrows 65. For the second mist extractor 43 the angle would be reversed in position by 180° so that they would provide the same kind of obstacle for gas moving radially inwardly. Whatever liquid remains entrained on the gas is scrubbed out by contact with these obstacles. The metal of which they are constructed is such as to be wetted by the liquid so that the oil forms a film on the surface of these objects and the liquid can move downwardly by gravity to the bottom of the mist extractors 43 and 44 through the holes in plates 64 and the pipes 42 down to the base of the chamber 18.

The angular obstacles are set into holes drilled or punched in the plates 64 so that liquid which collects on the angular obstacles can drop downwardly through the plates 64 through plate 29, through pipes 42, to the bottom of the chamber 18. From the bottom of the chamber 18 the liquid can pass down through the pipe 52 sealed into the transverse wall 22 and then into the central chamber 16.

The relatively dry gas then passes out through the exit pipe 50. Due to the pressure drop which is necessary to drive the gas 46 through the tortuous path in the mist extractors, the second chamber 16 is at a higher pressure than chamber 18 and outlet 50.

All gas passes through a mist extractor. There must be no way that the bypass gas can go from the central chamber directly upwardly through the outlet pipe 50. Thus the top mist extractor 43 is separated from the bottom mist extractor 44. All gas must pass through 43 which is an outside-in flow extractor. Gas passing through pipe 38, minus bypass gas through gap 40, passes through pipe 39 and extractor 44, which is an inside-out flow extractor. The down flow pipe 52 can pass only liquid. This is sealed at its bottom end by a pool of liquid with surface 54. This liquid can move downwardly into the bottom chamber through pipe 56, the inlet of which is sealed through the divider 20 and extends upwardly beyond it, forming a weir, and the liquid surface 54.

The pipe 56 which is formed into a helical pattern to prevent interference with the gas liquid vortex being formed, carries liquid from the surface 54 down into the bottom chamber 14 where it is drawn off. The quieting baffle 36 is designed to prevent circulation and rotation of the liquid in the bottom chamber and provide a quiet zone for the liquid level controls A and B. The two controls A and B and the two outlets 30 and 32 are provided for the separation of oil and water, which may be originally entrained in the entering gas mixture.

The gap 40 in the tube 38 is made of two pipes 38 and 39 which are slightly different in inner diameter. Pipe 39 is slightly smaller and has its bottom end beveled in the manner shown. The reason for the smaller diameter is that as the gas 45 moves upwardly it may carry liquid with it wetting the inner surface of the pipe 38. The smaller diameter and the sharp edge of the pipe 39 thus tends to skim off the liquid and force it out of the gap 40. The two parts of the pipe are supported by being welded to bars 37.

Referring now to FIG. 4 there is illustrated an equivalent second embodiment which is similar to that of FIG. 1 except that the mist extractor 37 is of a different type. This comprises a central pipe 38 about which is wound a batt of fibrous material 53, with large interfiber spaces, so that the gas can penetrate through the spaces between the fibers and cause the liquid particles to be collected on the fibers and to wet the surface and to flow downwardly into the bottom of the chamber on top of the divider 22'. There is an opening in the divider through which liquid can pass downwardly through conduit 52' and into the second chamber 16' where it collects on the top of the first divider 20' forming a liquid level at 54. A gas bypass opening is provided at 49 which allows gas passing through gap 40' to bypass mist extractor 53. Mist extractor 51 is provided to scrub gas bypassing through opening 49.

As in the case of FIG. 1, there is a cylindrical wall 58', corresponding to the wall 58, which surrounds the lower end of the pipe 38. This aids in the formation of the rapidly revolving vortex 45 as it passes up the vortex tube 38 and protects tube 38 from extraneous liquid which might be carried into it.

In FIG. 5 is shown another variation in which a strip of thin metal is formed into a twisted form so that the rapidly moving gas is given additional rotary motion as it passes up the tube 38''.

While the invention has been described with a certain degree of particularity, it is manifest that many changes may be made in the details of construction and the arrangement of components. It is understood that the invention is not to be limited to the specific embodiment set forth herein by way of exemplifying the invention, but the invention is to be limited only by the scope of the attached claim or claims, including the full range of equivalency to which each element or step thereof is entitled.

What is claimed is:

1. A centrifugal separator for separating liquid from gas, comprising:
   a. a vertically oriented cylindrical shell having a top, bottom, and cylindrical wall;
   b. said shell divided into three chambers, a first bottom chamber separated from a second central chamber by a first transverse dividing wall, and a third top chamber separated from said second chamber by a second transverse dividing wall;
   c. an inlet pipe entering said first chamber near said first dividing wall, through which a mixture of liquid gas is introduced into said first chamber, and means to impart a tangential flow of said mixture in said first chamber;
   d. means to withdraw separated liquid from the bottom of said first chamber;
   e. an axial tube sealed through said first and second dividing walls, said tube formed of two parts, spaced slightly apart to form a narrow gap in the wall of said tube, said gap positioned in said second chamber;
   f. means utilizing the flow of the liquid-gas mixture in said separator to create a zone of low pressure in said second chamber;
   g. conduit means within said cylindrical shell to communicate said zone of low pressure with said third chamber; and
   h. means to remove gas from said third chamber through a mist extractor.

2. The separator as in claim 1 wherein said means to create said zone of low pressure is the inlet tangential flow of said liquid and gas mixture in said first chamber.

3. The separator as in claim 1 including twisted vane means inside said axial tube.

4. The separator as in claim 1 including conduit means to carry liquid from said second chamber down to said first chamber.

5. The separator as in claim 4 in which said conduit means comprises a helically formed liquid downcomer pipe conforming to the vortex pattern in the bottom chamber.

6. The separator as in claim 1 including means to bypass a small portion of total gas from the second chamber to third chamber.

7. The separator as in claim 6 including means for scrubbing said bypassing gas.

8. The separator as in claim 1 wherein said means to create said zone of low pressure comprises said mist extractor in said third chamber through which gases from said axial tube pass creating said low pressure in said third chamber.

9. The separator as in claim 8 in which said mist extractor comprises two parallel spaced discs and including a plurality of axially oriented elongated elements arranged in spaced relation in an annular portion of, and fastened between said discs, said positions such that in its flow radially through said elements, said gas will be deflected by a plurality of said elements.

10. The separator as in claim 9 including means for movement of liquid from inside said mist extractor in said third chamber down to said second chamber.

11. A method of separating a mixture liquid and gas comprising the steps of:
   introducing said mixture of liquid and gas, under pressure, into a first chamber circumferentially to cause initial separation of major quantities of liquid and gas to cause said gas and minor amounts of liquid to create a central axial vortex of high velocity,
   passing said vortex of said gas and minor amounts of liquids through a tube to a second chamber, said tube having a slitted opening therein communicating with a third chamber intermediate said first and second chambers,
   flowing said gas through a first mist extractor by inside-out flow thence to a second mist extractor by outside-in flow to an outlet,
   maintaining a high to low pressure differential across said first mist extractor whereby a zone of lower pressure is created in said second chamber,
   communicating said lower pressure zone with said third chamber to cause withdrawal of a portion, of said gas and separated liquid collected inside said tube through said slitted opening in said tube to said third chamber,
   separating a major portion of said gas and liquid withdrawn into said third chamber and because of said low pressure zone flowing the separated gas to said second chamber for passage through said second mist extractor, and
   collecting liquids removed in said second and third chambers and transmitting same ultimately to said first chamber for removal.

* * * * *